US005598598A

United States Patent [19]

Sorenson

[11] Patent Number: 5,598,598

[45] Date of Patent: Feb. 4, 1997

[54] PAINT APPLICATOR WITH IMPROVED EXTENSIBLE HANDLE

[76] Inventor: Gregg R. Sorenson, 1201 S. 72nd St., West Allis, Wis. 53214

[21] Appl. No.: 421,622

[22] Filed: Apr. 13, 1995

Related U.S. Application Data

[63] Continuation of Ser. No. 278,838, Jul. 22, 1994, which is a continuation-in-part of Ser. No. 22,504, Feb. 25, 1993, abandoned.

[51] Int. Cl.[6] .................................. B25J 1/02; B25G 1/04

[52] U.S. Cl. ......................... 15/144.4; 15/230.11; 16/115; 294/19.1

[58] Field of Search ............................... 15/143.1, 144.1, 15/144.4, 230.11; 16/115; 294/19.1

[56] References Cited

U.S. PATENT DOCUMENTS

| | | | |
|---|---|---|---|
| 1,327,597 | 1/1920 | Greene | 15/143.1 |
| 3,380,097 | 4/1968 | Pharris | 15/145 |
| 3,407,424 | 10/1968 | Lanzarone et al. | 15/145 |
| 3,596,946 | 8/1971 | Burton | 287/58 |
| 3,751,748 | 8/1973 | Roe et al. | 15/230.11 |
| 3,866,257 | 2/1975 | Cansdale | 15/230.11 |
| 4,325,157 | 4/1982 | Balint et al. | 16/115 X |
| 4,466,152 | 8/1984 | Moss et al. | 15/229.1 |
| 4,653,142 | 3/1987 | Upton | 16/115 |
| 4,659,135 | 4/1987 | Chuan | 294/19.2 |
| 5,099,539 | 3/1992 | Forester | 15/145 X |

*Primary Examiner*—Chris K. Moore

[57] ABSTRACT

A handle assembly for adjustably positioning a paint roller or other tool or implement adjacent a work surface. The handle assembly includes a first hollow handle section, with an exposed exterior hand grip surface adjacent its near end, a second hollow handle section slidably received inside the first handle section, and a third section carrying the roller or tool at its far end and having its inner end sliding inside the second handle section. The second handle has a first releasable lock assembly at its near end, and the third handle section has a second releasable lock assembly at its near end. The second handle has a hand grip with a skin portion overlying but spaced from the outer diameters of said first and second handle sections to provide an annular recess for receiving the far end of said first handle section when the handle sections are telescoped into nested relation.

19 Claims, 2 Drawing Sheets

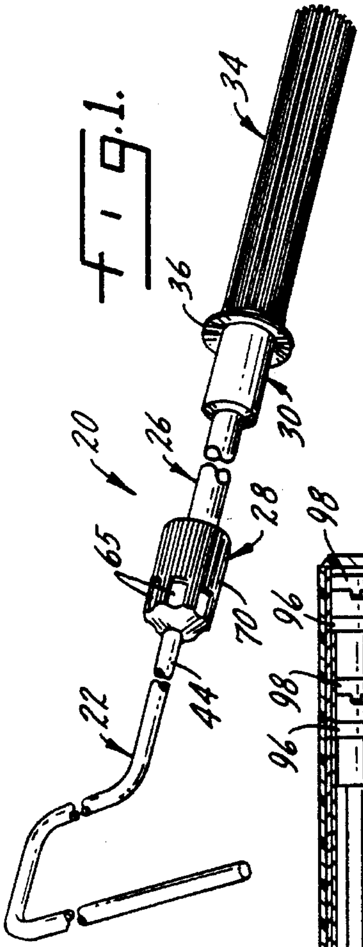
Fig. 1.
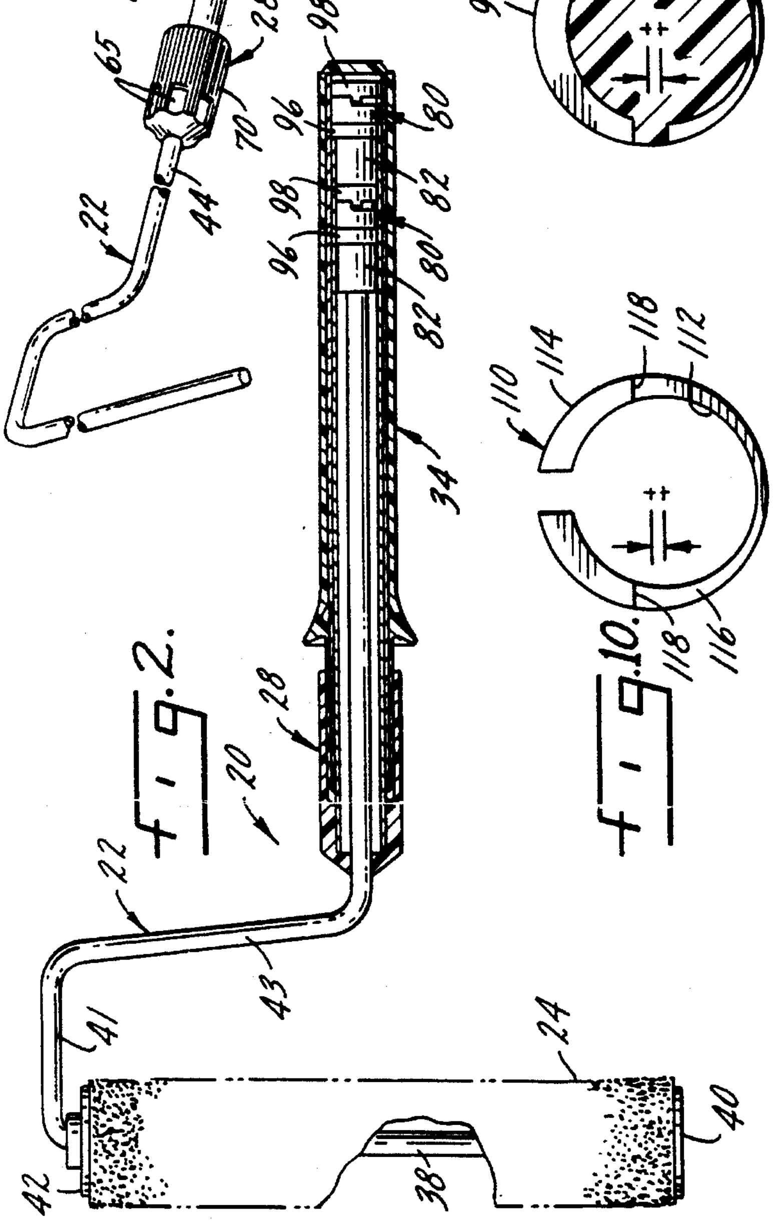
Fig. 2.
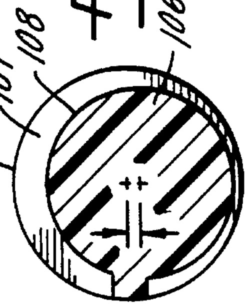
Fig. 11.
Fig. 10.
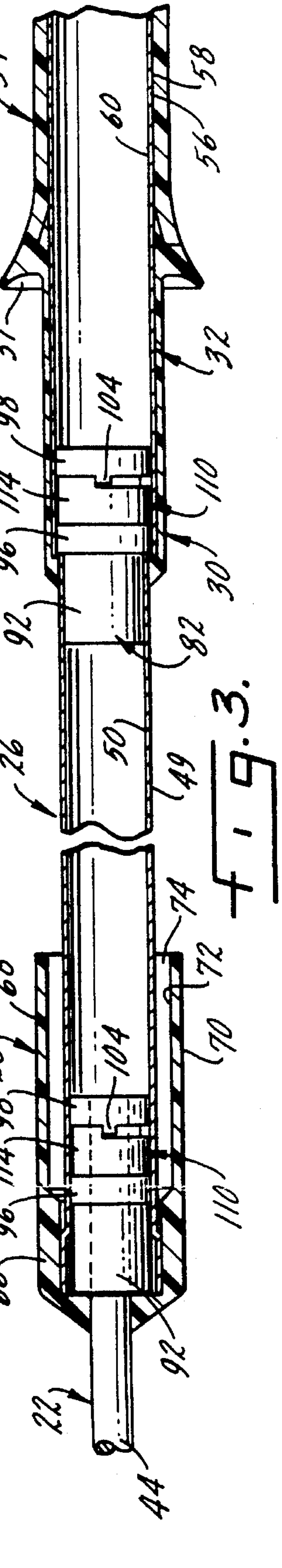
Fig. 3.

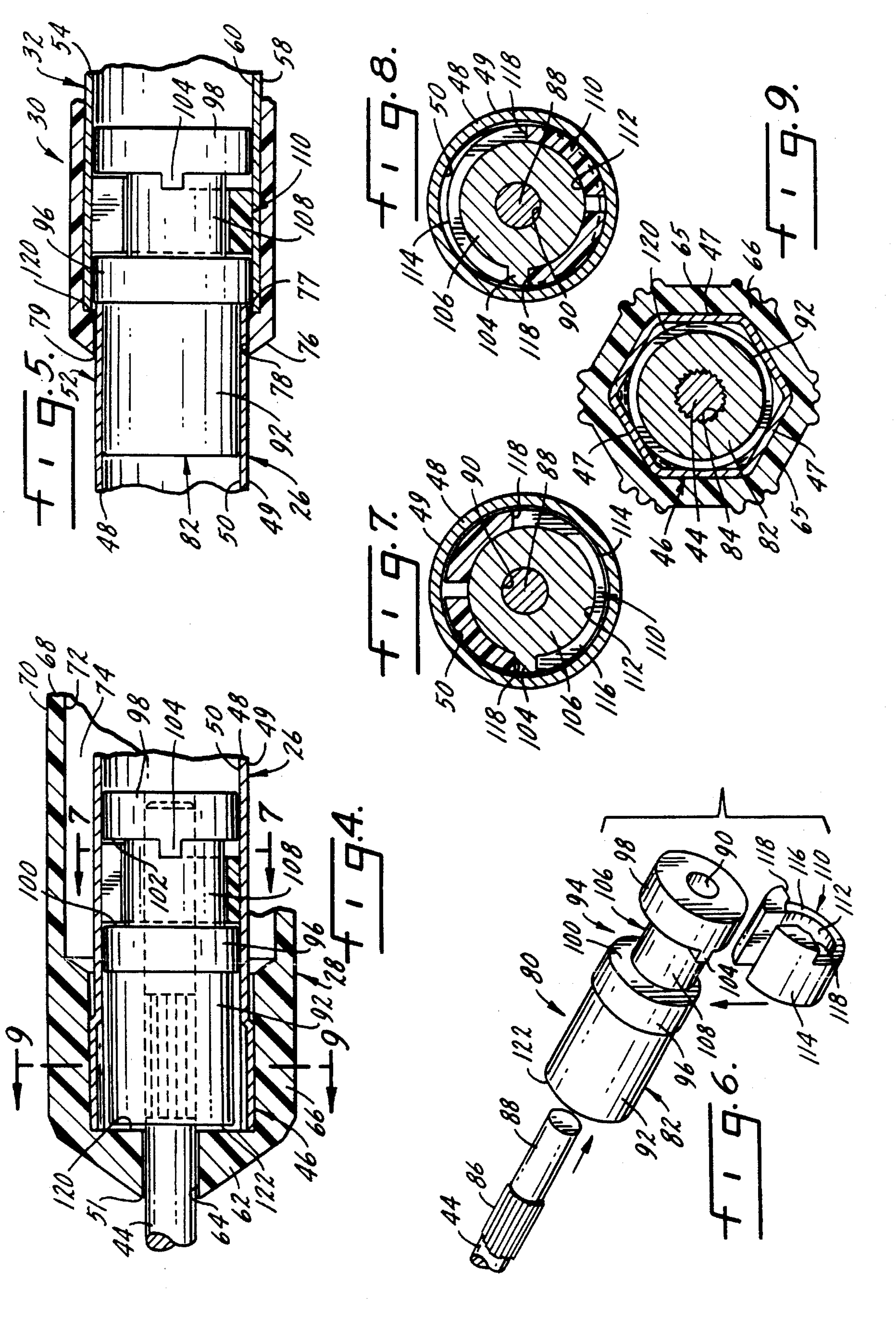

PAINT APPLICATOR WITH IMPROVED EXTENSIBLE HANDLE

This application is a continuation of application Ser. No. 08/278,838, filed Jul. 22, 1994, which in turn was a continuation-in-part of application Ser. No. 08/022,504, filed Feb. 25, 1993 now abandoned.

BACKGROUND OF THE INVENTION

The present invention relates generally to home appliances such as paint application rollers, brushes and the like which are manipulated by means of a telescoping, extensible handle. In one form, the invention is embodied in a paint roller that includes three telescoping elements adapted to provide the utmost in simplicity and reliability of manipulation, light weight and rigidity at low cost. In addition, the principles of the invention are applicable to other related but different apparatus such as scrapers, brushes, and the like wherein a properly designed, low cost, extensible handle is needed.

In recent years, particularly with the development of carefully formulated, water dilutable paints able to be applied by rollers, there has been a continuing demand for a paint roller that will meet a number of criteria.

Referring now to the requirements for a paint roller, such a product must be very sturdy, even in the extended position. While paints of the kind customarily applied by rollers are thixotropic, and hence somewhat resistant to dripping, any undue play or wobbling in the handle is definitely detrimental to roller performance. Particularly when it is considered that much painting is done above floors, furniture, rugs, and other articles to be protected against splash, drip or spray, it is essential that the handle be free from any tendency to wobble during use.

Moreover, it is very important that the handle, although made in segments adapted to telescope, be positively locked against both axial play and radial or rotational movement. Manipulating the roller so as to place it flat against the surface to be painted is an important aspect of paint application. If the roller tends to rotate around the handle axis, application of the paint can be erratic and problematical.

Regarding the ability to telescope, while a long handle is desired for a number os uses, limits on storage space and manipulation in the vicinity of the paint tray and on ladders require that the unit be able to be collapsed or telescoped smoothly into a compact position without difficulty. In this connection, the ability to loosen and/or tighten the respective telescoping sections relative to each other without application of high forces, is very important. The locking and releasing action must be able to be accomplished easily, inasmuch as such action may be required to be taken even when the roller is filled with paint.

For example, it may sometimes be desirable to fill the paint roller from the tray while the handle is in a retracted position and thereafter to extend the handle while the roller remains filled with paint. Components that extend only with sudden, jerky movements have the potential for permitting paint to splash and drip; this is also a risk to be avoided.

While the prior art has provided constructions which, if able to be manipulated properly, have met some of the above criteria, even the best prior art products have suffered from one or more drawbacks. In particular, these drawbacks or shortcomings lay in the area of the ability of a three-piece device to secure two relatively rotatable parts for clamping or releasing relative to each other, when and to the extent desired. Thus, it is important that the roller be able to be manipulated so that any one section can be moved relative to an adjacent section without requiring a particular sequence of extension and retraction, and without the need to grasp the components in an awkward manner or in a way which requires tools or the like.

In one prior art construction which is similar to the present invention but relative to which the present invention is a substantial improvement, a pair of cam lock devices have been provided for a rod and tube type of paint roller assembly. In U.S. Pat. No. 3,751,748, issued Aug. 14, 1973 to Roe et al., a pair of locking devices are provided, one to permit a pair of telescoping tubes to be moved or be locked relative to each other and a second cam lock arrangement to permit a rod portion of the unit to be telescoped relative to one of the tubes.

In such an apparatus, manipulating the cam lock so as to move one tube relative to the other is able to be readily accomplished. However, grasping and manipulating the elements necessary to move the rod relative to the smaller tube have proven problematical and erratic in use. In particular, when it was desired to extend the rod portion of the handle relative to the smaller tube, especially when the roller is filled with paint and the larger tube in fully nested, this has not been able to be accomplished in an easy, reliable and consistent manner.

In particular, the portion of the cam lock that is required to be held against rotation relative to the rod is of a small ferrule-like construction with a minimal axial extent. Securing this element against rotational movement relative to the rod has proven difficult and in some cases impossible without using tools such as pliers or the like. Expanding its axial extent would appear to compromise its ability to telescope fully.

In this connection, it will be appreciated that tightening and releasing the handle elements be relative rotation of two parts is theoretically almost foolproof. However, many users, in their anxiety to insure that there will not be axial or rotational movement of the components relative to each other, manually overtighten the locking elements, thus securing the parts together in very tight relation. When it is time to release these parts relative to each other, one portion of the lock, in prior art devices, has undesirably remained locked against rotation and is unable to be grasped for this purpose without either extending the other part of the handle or using tools such as pliers. Needless to say, the use of tools or auxiliary means to position and secure a roller, especially when loaded with paint, constitutes a drawback in an otherwise satisfactory product.

It would be highly desirable, therefore, is both rod movement relative to one of the tubes as well as movement of one of the tubes relative to the other, could be accomplished in a completely reliable, low-effort manner, permitting the user the choice of extending either or both of the support elements relative to the other in a simple and effective manner.

In view of the failure of the prior art to provide an appliance such as a paint roller or the like with an extensible telescoping handle that is able to be made at low cost and be both completely reliable and very convenient in operation, it is an object of the present invention to provide a paint roller apparatus with an improved extensible, telescoping handle.

It is another object of the invention to provide a paint application apparatus which includes a roller and a rod section for carrying the roller, and a pair of telescoping tubes, with a pair of eccentric or similar locking devices being provided to permit axial and rotational movement of the elements relative to each other by a simple manipulation of two handle parts of the apparatus.

A further object of the invention is to provide a telescoping handle arrangement for paint rollers or the like wherein no tools are required for use and in which any degree of adjustment within the overall length of the components may be easily accomplished by grasping exposed surfaces of the product, including a pair of hand grip elements that permit full retraction or nesting of the handle tubes.

A still further object of the invention is to provide a telescoping handle arrangement having at least two one-way or overrunning clutch type locking arrangements which are simple and self-contained, and which are very effective in sue, especially when used with a proper arrangement of hand grips and other exposed surfaces.

Yet another object of the invention is to provide a locking mechanism wherein, when two parts are to be released relative to each other, unlimited rotation is permitted in one direction, and relative rotation in another direction will rapidly secure the parts together.

Another object of the invention is to provide a locking/releasing arrangement which includes two sets of locks and two hand grips, one associated with each part of the locking devices, to facilitate grasping and manipulating whichever set of locks is desired.

A further object of the invention is to provide a telescoping handle apparatus for a paint roller or the like wherein the components are easily manufactured at low cost and wherein the device may be assembled in a simple and straightforward manner without using fasteners or adhesives.

A still further object of the invention is to provide an apparatus having a pair of locking devices, one of which is carried by a rod moving in a smaller diameter tube, and the other being carried by such smaller tube and moving within a larger tube, and wherein, in the retracted position, the locking devices lie adjacent each other within the larger tube and wherein a hand grip for the smaller tube can be provided without sacrificing compactness and full retractability.

Yet another object of the invention is to provide a locking mechanism which include a pair of cooperating cam lock elements, one including cylindrical guide surfaces for an adjacent tubular member and each including an eccentric or offset portion adapted to ensure that upon relative rotation in a given direction, the parts will be wedged together into a locked relation.

Another object of the invention is to provide a telescoping handle wherein, in one embodiment, the exterior of the larger tube serves as one handle for a tube pair and wherein the smaller tube includes a hand grip portion in the form of a skirt that radially closely overlies both the larger and smaller tubes and provides an annular recess for a part of the other hand grip.

The foregoing and other objects and advantages of the invention are achieved in practice by providing a paint roller handle assembly that includes a hollow first tube of a larger diameter, a hollow second tube of a smaller diameter and a still smaller rod or tube, with all of the rods or tubes comprising handle sections and being telescopingly retractable with respect to adjacent elements, and with the rod or smallest unit and the smaller tube each carrying a one way locking device on its end, and with the smaller tube having a hand grip providing an attachment portion and an axially extending skirt portion providing a recess between its inner diameter and the outer diameter of the smaller tube so as to accommodate the end of the larger tube when the units are in the retracted position.

The manner in which the foregoing and other objects and advantages of the invention are achieved in practice will become more clearly apparent when reference is made to the following detailed description of the preferred embodiment of the invention set forth by way of example and shown in the accompanying drawings in which like reference numbers indicate corresponding parts throughout.

BRIEF DESCRIPTION OF THE DRAWING

FIG. 1 is a perspective view, with portions broken away, of a paint roller assembly made according to the invention and showing the same in a partially telescoped position of use;

FIG. 2 is an enlarged partial sectional view of the paint roller of FIG. 1, showing the inner and outer tube portions of the handle assembly as well as the clutch or eccentric locking units and hand grips forming a part of the improved paint application roller assembly of the invention;

FIG. 3 is a further enlarged vertical sectional view, with portions broken away, showing the various portions of the handle assembly in the fully extended position;

FIG. 4 is a further enlarged vertical sectional view of the mechanism for locking the inner tube and the rod unit;

FIG. 5 is a view similar to that of FIG. 4 but showing the releasable locking arrangement for the larger and smaller tubes respectively;

FIG. 6 is a perspective view of the eccentric lock or clutch arrangement of FIG. 4;

FIGS. 7–8 are vertical sectional views, taken along lines 7—7 or FIG. 4, FIG. 7 showing parts in an unlocked condition and FIG. 8 showing the parts in a locked condition;

FIG. 9 is a vertical sectional view, taken along lines 9—9 of FIG. 4; and FIGS. 10 and 11 are partly diagrammatic views showing the offset or eccentricity between the inner cylinder of the lock assembly and its associated locking ring.

DESCRIPTION OF THE PREFERRED EMBODIMENT OF THE INVENTION

While the apparatus of the invention may be embodied in several different forms, the description of the presently preferred form of apparatus will be given wherein the handle comprises three pieces and wherein the supported article is a paint roller.

Referring now to the drawings in greater detail, FIGS. 1–3 show a paint roller assembly generally designated 20 and shown to include a plurality of principal elements, namely, an extensible rod element generally designated 22 and supporting a rotatable roller generally designated 24 (FIG. 2), an inner telescoping tube element generally designated 26 and having positioned at its forward end a forward hand grip generally designated 28 and shown to have a preferred contour to which reference will be made later.

In addition, FIG. 1 shows a tubular sleeve generally designated 30 and secured over an other tube generally designated 32 (FIG. 3)) over which is received a contoured large rear hand grip generally designated 34 and preferably including a grip flange 36, which keeps the handle from sliding too far down into an associated paint tray. An annular area 37 keeps paint form dripping or running on the O.D. of the hand grip 34 when the roller is in use, and hence the generally radially outwardly extending grip flange functions as a liquid barrier to keep paint or other coating from coming into contact with the outer surface of outer tube 32.

Referring again to the rod element 22, this unit includes a roller mounting leg generally designated 38 positioning a pair of opposed mounting spools generally designated 30, 42 that are journalled for rotation on the roller mounting leg 38 of the rod 22 by conventional or other methods. The rod 22 also includes a spacer leg portion 41, an offset leg 43 and a main rod leg 44 (FIG. 1) which is extensible and retractable within the inner tube element 26 in a manner to be described.

Referring now to the inner telescoping tube element 26, this unit preferably includes, as best shown in FIG. 4, a contoured front section 46 and shown to include a hexagonal arrangement of flats 47 (FIG. 9), and a slightly reduced diameter main body portion generally designated 48 having a tubular outer surface 49 and an inner surface generally designated 50, and terminating in a rear end portion generally designated 52 (FIG. 5).

Referring now to the outer tube generally designated 32, this unit is shown to include a forward end portion generally designated 54 and a main body portion 56 (FIG. 3), the outer diameter surface 58 of which positions the rear hand grip 34. An inner cylindrical surface 60 serves as an important part of the telescoping mechanism to be described herein.

Positioned over the forward end of the inner tube element 26 is the forward hand grip generally designated 28 which is shown to include a beveled neck portion 62 providing a cylindrical sidewall 64 defining an opening through which a portion of the main rod leg 44 extends in use. A sharp scraper surface 51 is provided to prevent paint build-up on the O.D. of the rod section 44. The forward hand grip 28 also includes a forward sleeve portion 66 into which the contoured front section 46 of the inner tube 26 is press fit to prevent relative movement of these two elements. Flats 65 are formed in the front grip section 46; these flats match the hex-pattern sides 47 of the contoured tube section 46. Other non-circular shapes can be used, of course.

In addition, the front hand grip 28 importantly includes a skirt-like element, here a cylindrical skirt 68, having an outer cylindrical gripping surface 70, an inwardly spaced circumferentially extending surface 72 defining a small annular passage 74 between its inner surface 72 and the outer surface 49 or the inner tube main body portion 48. In this instance the skirt-like element 68 has a continuous outer surface. The skirt and the skirt recess 74 are important features of the invention. According to the arrangement just described, the front hand grip 28 is secured in tight, movement-free relation to the front end of the inner tube 26.

Referring now to FIG. 5, it will be noted that the forward end portion 54 of the outer tube 32 positions a tubular sleeve generally designated 30 that includes a neck portion 76 with a cylindrical surface 78 defining a center passage therethrough. The outer surface 49 of the inner tube 26 is spaced from this passage surface 78 by only a working clearance. A sharp edge 79 acts as a scraper for dried paint attached to the outer tube surface 49. An inner shoulder 77 is smaller than the O.D. of the tube 54 for purposes of retaining the parts in place.

Referring now to FIG. 6, there is shown a lock assembly generally designated 80 which forms an important part of the invention. In the preferred form of apparatus, which includes three slidable telescoping members, (a rod and inner and outer tubes), two such locks are provided. The two locks are functionally identical, differing only in the manner in which they are secured to their associated movable elements and in their sizes. In this connection, it will be realized that the locking elements slide axially relative to an associated, relatively stationary part and must be separated therefrom by a working clearance which is small enough to aid stability and alignment and large enough to permit movement when needed. Each locking element is carried by a relatively movable part to which it is affixed.

Thus, referring again to FIGS. 6–9, it will be seen that a lock unit generally designated 80 includes a cylindrical main body generally designated 82. The lock 80 used with the rod 22 has a central, splined bore 84 for receiving a spline 86 on the rear end portion 88 of the main rod leg 44. The end 88 of the rod leg 44 may extend through the cylindrical opening 90 in the body 82 and the splined surface insures a snug fit between these components. The force available with the press-fit splined joint is much greater than that available using prior pin or stake attaching methods and thus the spline attachment is an important advantage.

The lock assembly 80 also includes a cylindrical outer surface 92 which is nonfunctional relative to the association with the rod. However, this surface serves to mount the body 82 of the lock 80 relative to the tube 26. The lock assembly 80 includes, in addition to the body 82, a spool portion generally designated 94 and shown to include front and rear cylindrical guide surfaces 96, 98, each being defined in part by end face surfaces 100, 102 (FIG. 4) a ring stop element 104 and an inner, ring mounting cylinder 106 which is offset with respect to the center lines of the cylindrical surfaces 96, 98. The ring mounting cylinder generally designated 106 includes a cylindrical outer ring support surface 108. In this connection, it will be realized that while the surface 108 is circular, its center line is offset from the center lines of the circular cylindrical surfaces 96, 98. Accordingly, an eccentric groove 107 is defined between the various surfaces 100, 102, and 108.

The other principal element of the lock assembly 80 it an eccentric split locking ring generally designated 110 and shown in FIG. 6, for example, to include an inner surface 112 for engaging the ring support surface 108, an outer, tube contracting surface 114, inner and outer locating end faces 116 and a pair of stop shoulders 118.

Referring now to FIGS. 7–11, and particularly to FIGS. 10 and 11, the offset center lines of the ring mounting cylinder 106 and the locking ring 110 are shown. The locking ring 110 is a circular cylinder on its outside diameter surface 114, and includes a circular cylindrical inner diameter surface 112, the latter however being offset from the center line of the outer diameter surface 114.

FIG. 11 shows an analogous construction for the ring mounting cylinder 106, i.e., the inner and outer cylinders 106, 92 are both circular, but their center lines are slightly offset. With this arrangement, it is apparent that there is one position wherein the locking ring 110 and the ring mounting cylinder 106 may be aligned such that the outer diameter surface 114 of the ring 110 is aligned with and parallel the guide surfaces 96, 98. However, relative rotation of the ring 110 and the cylindrical locking body 82 will cause portions of the ring outer surface 114 to move radially outwardly, pinching them into engagement with the tube I.D. In operation, this is how a releasable locking action is achieved, as will now be described.

Referring again to FIG. 4, it will be noted that the lock assembly 80 is inserted into the front end of the inner tube 26 with the cylindrical surfaces 96, 98 on the body 82 being in sliding contact with the inner surface 50 of the inner tube 26. The neck 62 of the forward hand grip 28 has a rear surface 120 facing the end face 122 of the locking body. This insures that the locking body cannot be removed from the end of the tube 26. A slight working clearance between the surfaces 96, 98 and the inner surface 50 of the tube 26 permits axial relative movement of these parts, as long as there is no additional interference.

This additional interference, for purposes of locking the parts together, is introduced when there is relative rotation between the locking ring 110 and the locking body 82. In this connection, the outer surface 114 of the locking ring 110 is biased into a very slight but positive engaging contact to the surface 50, such that the ring 110 is carried with the tube 26 when it is rotated. If the tube 26 is rotated clockwise relative to the rod 44, this will cause the ring 110 to rotate around its own axis from its aligned or zero offset position relative to the ring mounting cylinder and become wedged into an ever-tighter relation between the inner cylinder 106 and the sidewall 50, locking these elements into place with an extremely tight fit.

Rotating the handle in the opposite hand rotation (counterclockwise) will move the ring back into a position such as that shown in FIG. 10, wherein there is substantially no interference except the slight intentional interference between the ring outer surface 114 and sidewall 50.

After some initial rotation of these parts, the stop shoulder 118 on the ring 110 will engage the ring stop 104 on the locking body 82. Thereafter continued rotation will merely permit the ring to slide over the inner surface 50 of the tube. No wedging action can be created because the ring is centered and it cannot move to an offset position. Thus, a very effective, high mechanical advantage, one way clutch or locking arrangement is provided. The mechanical advantage is considerable, with the wedging action resulting from only a slight, gradual offset being taken advantage of. Desirably, the wedging action is gradual enough that the parts will deform slightly if tightened firmly, and remain locked in this position. However, a slight partial twist in the opposite direction will immediately free the locking engagement.

Referring now to FIG. 5, it will be seen that there is an identical arrangement of parts except for the size, and the fact that, in the rear lock assembly, the outer cylindrical surface 92 of the body 82 is press fit into the rear end portion 52 of the inner tube 26 and that the relative sliding action is between the inner tube 26 and the outer tube 32. FIG. 5 shows the inner tube 26 fully extended. Here, the surface 120 on the neck 76 interferes with the outermost edge portions of the outer tube 54, preventing the assembly form coming apart.

Referring now to another important feature of the invention, and referring again to FIGS. 4–6, it will be seen that the recess 74 will accommodate the tubular sleeve 30 on the forward end of the outer tube such that these parts may telescope into each other for full retraction. However, the skirt 68 importantly axially overlaps this sleeve 30, in effect permitting the inner tube to be gripped against rotation. Accordingly, when it is time to move the rod, a portion of the offset leg 43 may be grasped and the forward hand grip rotated slightly counterclockwise. This rotation of these parts releases the locking action.

When the desired position of extension or retraction is reached, the rod is held at the offset leg and the forward hand grip 28 manipulated clockwise as just described. To slide the inner tube relative to the outer tube, the front and rear hand grips are grasped, and relative rotation, first counterclockwise and then clockwise will respectively release and retighten the slidable elements relative to each other.

While one form of the invention is embodied in an arrangement having three movable elements and two locking units, additional telescoping members may be added simply by telescoping then in the same manner as the present elements are telescoped.

As pointed out, a major advantage of the invention is that the forward hand grip does not restrict telescoping movement of the outer tube relative to the inner tube, but still provides a surface that can be grasped when the rod is fully retracted and the outer tube surrounds the inner tube. In prior art constructions, this was difficult or impossible to be done with the hands because the action of telescoping the parts together prevented access to the relatively rotatable parts that were required to be gripped.

In keeping with the preferred form of the present invention, aluminum tubing and rods are provided and the locking elements are made from nylon or like synthetic plastic materials.

In the preferred embodiment of the invention, an eccentric-ring-in-an-eccentric-groove-type locking mechanism has been described. This is the preferred form of locking apparatus from the standpoint of simplicity, reliability, ease of use and low cost. However, other one-way locking devices are known which may also be suitable for practicing the invention. These include overrunning clutch assemblies, generally including those using spring biased rollers movable in inclined ramps, and tilting-type sprag assemblies such as those used on pipe clamps, etc.

Preferably, aluminum is used for the tubing and aluminum or steel for the rod section, with the locking device parts being made from appropriate plastic material such as nylon or the like. The front hand grip is preferably injection molded from a relatively rigid plastic material, whereas the main or remote handle grip is preferably made from or covered with a foam plastic or rubber.

The ring and skirt 36 and the annular anti-drip groove 37 are important commercial aspects of the invention and are an improvement over roller handles that used hooks or the like to prevent the roller form sliding into the tray. These devices required alignment of the hook or other stop member with the tray. Since the present handle rotates relative to the rod and the roller to adjust the length, the provision of a continuous skirt or ring rather than a hook or the like is strongly preferred so that an engagement surface for the paint tray is always provided.

It will thus be seen that the present invention provides a paint applicator with an improved extensible handle having a number of advantages and characteristics including those expressly pointed out here, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

I claim:

1. In an extension handle assembly, the combination of a first member, gripping means on the exterior of said first member, a second member, hand grip means on said second member, said second member being telescopically received within said first member, one end portion of said first member being insertable within the hand grip means of the second member when the members are fully telescoped, whereby the first member may be telescoped to its fullest extent possible with respect to the second member, and thereafter extended, while the two hands of a user, including all fingers thereof, remain in contact with said first and second members at all times and in all relative positions of said first and second members.

2. The combination of claim 1 further including a releasable locking device carried by a near end portion of the second member and being axially slidable, along with the second member, in the first member, said releasable locking device being actuatable by rotating the first and second members with respect to one another by means of hand applied force derived from the hands of a user while said user's hands are in gripping contact with the first and second members.

3. The combination of claim 1 further including a third member, said third member being telescopically received within said second member, said third member having a roller support at its outer end, and a second releasable locking device carried by the near end portion of said third member and being axially slidable, along with the third member, in the second member.

4. The combination of claim 3 further characterized in that said second releasable locking device is actuatable by rotation of the second and third members with respect to one another by means of hand applied force derived from the hands of a user while said user's hands are in gripping contact with (a) that portion of the third member which extends outwardly beyond the second member in all relative positions of the second and third member with respect to one another, and (b) the hand grip means on said second member.

5. The combination of claim 4 in which the hand grip means on said second member is in the form of a skirt-like element which includes hand gripping surfaces which are located about the periphery thereof, said skirt-like element being located radially outwardly beyond the perimeter of the first member a distance sufficient to receive the far end portion of the first member therewithin when the first and second members are in telescoped relationship with one another.

6. The combination of claim 5 further including a liquid barrier extending generally radially outwardly from the far end portion of the first member.

7. A paint roller handle assembly comprising, in combination, a hollow first tube of a given diameter having a hand grip portion at one end of its outside diameter, a hollow second tube of a smaller diameter and having its outer diameter telescopingly received within the inside diameter of said larger tube, a first releasable guiding and locking device carried on the near end of said inner tube and being slidable axially within said outer tube, a third handle portion having a roller support on its far end and having a second releasable guiding and locking device secured to its near end, said second locking device being received in sliding axial relation to the inside diameter of said second tube, and a second hand grip having its far end secured to the far end of said second tube and further having a gripping portion extending axially toward said near end thereof and having a skirt portion spaced apart from the outer diameter of said inner tube to provide therein a recess for accommodating the far end of said outer tube in the retracted position of said tubes.

8. A paint roller handle assembly as defined in claim 7 wherein each of said releasable guiding and locking devices include a locking body and an eccentric groove, and an eccentric ring positioned in said groove, with said ring being movable between positions of non-engagement and engagement with said inside diameter of an adjacent tube.

9. A paint roller handle assembly as defined in claim 7 wherein said releasable guiding and locking device comprises a pair of generally cylindrical, axially spaced apart guide surfaces spaced radially from the inside diameter of an adjacent tube by only a working clearance.

10. A paint roller handle assembly as defined in claim 7 wherein third handle portion is in the form of a rod having a roller axle portion, an offset leg portion and a spacer leg connecting said axle to said offset leg portion.

11. A paint roller handle assembly as defined in claim 7 wherein said second releasable guiding and locking device includes a locking body having a center passage extending therethrough, and wherein said third handle portion includes a rod having a splined near end portion, said splined end rod portion being snugly received by a press fit into said center passage in said locking body.

12. A paint roller handle assembly as defined in claim 7 wherein said first tube further includes a radially outwardly extending skirt portion adjacent the far end of said first hand grip portion, said skirt acting to prevent said paint roller from sliding downwardly relative to an associated paint tray and being further adapted to prevent paint from running axially onto said first hand grip when said roller end of said handle assembly is in a raised position.

13. A paint roller handle assembly as defined in claim 7 wherein said second hand grip is molded from a rigid plastic material, said far end of said hand grip and said far end of said second tube being of non-circular, congruent configurations and being secured to each other by a press fit.

14. A handle assembly for adjustably positioning a paint roller journalled for rotation about a given axis, said handle assembly comprising, in combination, a first, larger diameter hollow tubular handle section having respective ends near to and far from the user of said handle assembly, an exposed exterior hand grip surface adjacent said near end of said first section, a second hollow tubular handle section slidably received within the interior of said first handle section, and a third section having a roller support portion forming one of its ends and having its other end slidably received within said second handle section, with said second handle section having a first releasable lock assembly positioned at the near end of said second handle section, and with said third handle section having a second releasable lock assembly disposed at its near end, said second handle section having a hand grip at its far end, with said hand grip including a portion snugly secured to said far end of said second handle section and a skirt portion spaced radially outwardly from the outer diameters of said first and second handle sections to provide an annular recess for receiving the far end portion of said first handle section when said first and second handle sections are telescoped into a nested relation.

15. A handle assembly as defined in claim 14 wherein each of said releasable lock assemblies is of a type that includes a body with an eccentric groove therein and an eccentric ring positioned in said groove, said ring and said body containing said groove being relatively rotatable with respect to each other.

16. A handle assembly as defined in claim 14 wherein said third handle section is in the form of a rod, wherein said releasable lock assembly associated with said third handle section comprises a body portion with a central rod-receiving passage therein, and wherein an end portion of said rod is press fit within said center opening.

17. In combination, a first, outer tube having a given diameter and including an exterior first hand grip portion at the user end of said outer tube, a second, inner tube element having end portions respectively near and far from said user, said inner tube element including an eccentric ring and groove type twist lock mechanism carried at its near end, said twist lock mechanism also including guide surface portions to facilitate sliding said outer and inner tubes relative to each other in the unlocked position of said twist lock mechanism, said second tube also including at its far end a hand grip portion having an attachment portion secured against movement relative to said inner tube and a skirt portion extending rearwardly of said attachment portion, said skirt having an inner surface spaced radially outwardly from the O.D. of said second tube to provide an annular space for telescopingly receiving a far end portion of said larger tube; a roller support assembly including a portion for rotably journailing a roller, an offset portion and a handle extension portion, an eccentric ring and groove type twist lock assembly carried by said handle extension portion and also including guide surface portions to facilitate sliding said handle extension within said inner tube, said twist lock being operative to lock said handle extension and said inner tube against movement relative to each other.

18. The combination of claim 17 wherein said handle extension portion of said roller support assembly comprises a rod having an end portion press fit into a body portion of said twist lock assembly.

19. The combination of claim 17 wherein said eccentric ring and groove type twist lock assembly includes a body having a groove which includes a stop projection extending into said groove and wherein said ring includes a pair of stop shoulders forming portions of increased width in said ring, said shoulder and stop portions being engageable with each other to limit rotational movement of said ring.

* * * * *